Patented July 19, 1927.

1,636,493

UNITED STATES PATENT OFFICE.

ANTON EDUARD VAN ARKEL AND JAN HENDRIK DE BOER, OF EINDHOVEN, NETHERLANDS, ASSIGNORS TO N. V. PHILIPS GLOEILAMPENFABRIEKEN, OF EINDHOVEN, NETHERLANDS.

PROCESS FOR DISSOLVING A MIXTURE OF HAFNIUM AND ZIRCONIUM PHOSPHATES AND FOR SEPARATING HAFNIUM AND ZIRCONIUM.

No Drawing. Original application filed May 11, 1925, Serial No. 29,561. Divided and this application filed January 4, 1926, Serial No. 79,259, and in the Netherlands June 6, 1924.

This invention relates to a process for dissolving certain hafnium and zirconium phosphates and of separating hafnium and zirconium in the solution thus obtained.

According to the invention the process may consist in dissolving a mixture of phosphates of hafnium and zirconium in a medium containing phosphoric acid.

According to the invention hafnium and zirconium oxide can be precipitated out of the obtained solution of the hafnium and zirconium salts with the aid of a base or a basely reacting substance of sufficiently high concentration of hydroxylions.

According to the invention a mixture of hafnium and zirconium compounds is separated by starting from the solution of said hafnium and zirconium salts in a medium containing phosphoric acid. This solution can be separated in many known ways, e. g., by fractionally precipitating the solution with the aid of water.

The invention will be more clearly understood with reference to some examples:

100 cubic centimetres of a suspension of a mixture of hafnium and zirconium phosphate containing about 0.6 gram of metal can be entirely dissolved by adding 300 cubic centimetres of phosphoric acid having a specific weight of 1.75.

If the solution thus obtained is poured out in so large a quantity of a basely reacting substance that the liquid shows an alkaline reaction until the end, a deposit of a mixture of hafnium and zirconium oxides is obtained.

100 cubic centimetres of a suspension of a mixture of hafnium and zirconium phosphate containing 4% of hafnium relatively to zirconium are partly dissolved with the aid of 50 cubic centimetres of phosphoric acid of a specific weight of 1.75. If after filtration hydroxide is precipitated out of this solution by adding an alkaline reacting substance the hydroxide is found to be practically free of hafnium. If the remaining part of the suspension is treated once more with phosphoric acid the solution thus obtained is also found to contain but little hafnium, the not dissolved part of the suspension containing materially more than 4% of hafnium relatively to zirconium.

What we claim is:—

1. A process of converting a mixture of hafnium and zirconium phosphates, characterized in that said hafnium and zirconium phosphates are introduced into a medium containing phosphoric acid.

2. A process for converting a mixture of hafnium and zirconium phosphates, characterized in that said hafnium or zirconium salts are introduced into a medium containing phosphoric acid and that from said solution hafnium and zirconium oxide are precipitated by means of an alkaline reacting substance having a sufficiently high concentration of hydroxylions.

3. A process for converting a mixture of hafnium and zirconium phosphates, characterized in that said hafnium and zirconium salts are introduced into a medium containing phosphoric acid and that from said solution hafnium and zirconium oxide are precipitated by means of a base.

4. A process of separating hafnium and zirconium compounds, characterized by starting from a solution that can be obtained by bringing a mixture of hafnium and zirconium phosphates in a medium that contains phosphoric acid and submitting said solution to fractional separation.

In testimony whereof we affix our signatures at the city of Eindhoven, this 7th day of December, A. D. 1925.

ANTON EDUARD VAN ARKEL.
JAN HENDRIK DE BOER.